Patented May 1, 1934

1,956,728

UNITED STATES PATENT OFFICE 1,956,728

DISINFECTING AND STERILIZING LIQUIDS AND THE LIKE

Otto Ornstein, Berlin-Lichterfelde-Ost, Germany, assignor to firm "Aktiengesellschaft Chemischer Werte", Berlin, Germany No Drawing. Application January 12, 1933, Serial No. 651,353. In Germany July 26, 1929

7 Claims. (Cl. 167—14)

This invention has reference to the art of disinfecting and sterilizing pieces of apparatus, containers, implements and the like employed in the manufacture of food products generally, and it is intended to provide highly efficient germ-destroying compounds which, aside from other important objects and advantages, are distinguished by the fact that the solid or liquid food products or the like with which the apparatus, containers and implements are caused to come into contact are not injuriously acted upon by any remnants of the disinfecting preparations remaining in such apparatus and the like or on the walls thereof and that no deleterious action is exerted thereby on the health of the consumers of such food products. It is another important object of my invention to provide a composition and a manner of treatment of the apparatus, implements and the like which may be handled and applied even by unskilled assistants without fear of any injurious action on their health and which may be easily manipulated without the necessity of applying high heat, as in the case of the previous so-called physical sterilizing methods which comprised boiling or the application of hot and mostly superheated and flowing steam, and which will not interfere with the taste, palatability and flavor of the particular food products and will not be decomposed thereby and which will not be subject to the legal bar placed in some countries upon the use of chemical disinfecting compounds in connection with the manufacture of food products. It is a further object and advantage of my invention to avoid corrosion and chemical attack on the material of the containers, apparatus and machinery, such as wood, rubber, iron and other metals and the formation of solid decomposition products.

Broadly considered my invention is based upon the use of a combination of substantially neutral salts with comparatively weak solutions of soluble acids or alkalis of a certain concentration or of equivalent soluble acid reacting or alkaline reacting agents. The germicide action of such liquids and particularly of aqueous solutions is due to the fact that these substances are dissociated in solution into their ions which possess very marked germicide properties. Very dilute solutions of acids and alkalis without any further addition are known to possess such germicide properties which are proportional to their electrolytic dissociation; in the case of very high degrees of dilution or hydrolysis this germicide or bactericide activity is however not sufficient for the majority of practical purposes, but it may be greatly and unexpectedly increased by the presence of very small amounts of neutral, soluble and harmless salts which, if used alone, would be absolutely insufficient to produce germicide results. In accordance with previous suggestions these facts have been utilized for surgical disinfection by employing solutions of acids, or of alkaline electrolytes of a strength below about one fiftieth normal solution and containing about one seventh normal solution of a suitable water-soluble salt. Such solutions are however incapable of producing a practically instantaneous disinfection and sterilization on the containers and machinery, as is required in the manufacture of alimentary substances, liquids, juices, sirups and the like, and at such low concentrations the presence of neutral salts has been found to sometimes possess an undesirable tanning action on some organic bodies, membranes and the like.

In order to produce the required practically immediate disinfecting action it has heretofore been proposed by the inventor to use alkaline or acid aqueous electrolytic and salt-containing solutions of the kind referred to of a strength beyond one fiftieth normal, but his more recent careful experiments have shown that both in alkaline, as well as in acid aqueous solutions of this kind the germ killing or destroying efficiency is only inappreciably or not at all increased in the vicinity of the one fiftieth normal limit, so that solutions of a strength even several points beyond said limit fail to produce the desired substantially instantaneous germicide action. I have however ascertained by my recent experiments that the curve of germicide action takes a sharp turn at or about the concentration of electrolytic liquor of about one thirty-third normal both in alkaline as well as in acid aqueous solutions, and that the germ destroying capacity of such solutions is unexpectedly further increased by the addition of neutral water soluble salts within the previously suggested limits of weight corresponding to one seventh to substantially one-half normal solution of salts, such as for instance sodium chloride, potassium chloride, calcium chloride, bicarbonate of soda $NaHCO_3$ or other equivalent neutral salts, or in combination with mixtures of such salts in the concentration referred to. It has been ascertained that a few minutes' time will generally be sufficient to destroy any pathogenic germs that may be present within and on the walls of such containers, apparatus, machinery, pipe conduits and the like and without the necessity of using elevated temperatures, while on the other hand the use of heat or the addition to heated liquids does not interfere with the efficiency of the subject matter of this invention. In the case of using alkaline electrolytes, such as for instance solutions up to ⅛ normal NaOH with about 1/7 normal NaCl, there is the additional advantage that the alkaline liquid will dissolve or remove any remaining or adhering organic bodies and substances, such as remnants of fat, grease, skin, blood or the like that may have dried in contact with the containers and adhere thereto. The use of acid electrolytes of dilute nitric acid for instance in combination for instance with a solution of saltpetre of about ½-normal may advantageously be used as a washing and disinfecting agent for containers, implements and apparatus made of aluminium or as a disinfecting addition to certain kinds of juices and the like. A solution of dilute hydrochloric acid may for instance be used in combination with sodium-chloride or even sodium fluoride may be used to advantage. As regards the fluoride it may be noted that it will produce better results with medium concentrations of the sodium-hydrate electrolyte than with higher concentration of the agents, and broadly considered, with medium concentrations the fluoride has been found to be superior to the chloride. The importance of the addition of neutral salts generally may be judged from the fact that 1/30 normal hydrochloric acid, if used alone will kill bact. coli only after 24 hours, while in the presence of 1/7 normal solution of NaCl said acid produced a practically complete destruction of that germ shortly after vaccination; similar results are obtained with staphylococcus which is not even completely killed after 24 hours by the use of 1/30 normal hydrochloric acid alone, while with the addition of 1/7 NaCl a practically complete destruction of this germ is produced within an hour. Particularly favorable results have been obtained in the case of experiments with fungus growth and moulds, such as for instance with wild yeast (torula), sarcina and oidium. Experiments have shown that with a colony of 500,000 germs of oidium in the presence of ½-normal sodium chloride and 1/50 normal NaOH practically no results were obtained after ¼ hour, while by an increase of the concentration of NaOH to about from 1/33 to ⅛ normal and leaving the concentration of NaCl unchanged only 100,000 germs were found after ¼ hour; a further increase of the concentration of the alkali did not yield any better results, so that the maximum of the efficiency is dependent upon certain definite concentrations as stated in this specification and as pointed out in the claims.

Instead of caustic alkali I may use salts possessing a pronounced immediate electrolytic reaction, with liberation of ions such as sodium carbonate, sodium phosphate and the like, and it has also been ascertained that the reinforcing action of the neutral salts is more pronounced in the case of dissociated alkaline electrolytes such as in the case of NaOH than in the case of dissociated acid electrolytes. Sodium chloride and sodium fluoride as instances of neutral salts may be associated with sodium carbonate and sodium phosphate particularly in lower and medium concentrations.

Of acid electrolytes, to be employed as instances in my invention, I may mention by way of exemplification nitric acid to be used in combination with a half normal solution of saltpetre in the case of oidium, or acetic acid to be used in combination with sodium or potassium chloride. The use of the several agents will be governed by the kind and material of the apparatus employed and by the kind of germs present. Instead of or in combination with free acids I may use water-soluble acid salts capable of liberating H-ions in aqueous solutions.

It may be noted by way of example that in one cubic-centimeter of a rinsing liquid used for instance in the art of fermented liquors and the like 200 thousand germs have been found on an average. After having rinsed the respective containers or apparatus for say, about one minute's time, and then rinsing them thoroughly with sterilized water, it has been found that the germs had disappeared.

Of the various uses to which the invention may be applied I may mention the manufacture of fruit juices, meat juices, the manufacture of fermented liquors, irrespective of the degree of alcoholic strength and others, as well as the manufacture of preserves of various kinds.

As instances of the alkaline solutions which have been found highly efficient if prepared according to my invention I may mention mixtures of NaOH and NaCl either of which by itself would have a concentration of about 1/10 to 1/15 normal, and which, when mixed together will produce a normality of about 1/20 to 1/30 normal. This mixed final solution will show a hydrogen-concentration coefficient around pH=13.07. As exemplifications of the acid solutions I may mention solution of HNO₃ with KNO₃ possessing the same degrees of normality as the alkaline solutions mentioned and a hydrogen-concentration coefficient around pH=1.07. By using this concentration only one standard weight may be used for both kinds of constituents and both kinds of species, so as to simplify the weighing operation and to prevent mistakes. It is one of the important features of the invention that a pH concentration and dissociation-coefficient is produced corresponding to such a concentration of ions as will suffice for the killing of bacteria. The following examples will illustrate the manufacture of solutions according to this invention:

*Example 1.*—For the purpose of manufacturing 100 liters disinfecting solution 200 grams sodium-hydrate and 1180 grams NaCl are dissolved in water; the solution as obtained is directly ready for use.

*Example 2.*—100 liters of an acid disinfecting liquid may be obtained by dissolving 820 cc. of a 50%-strong nitric acid and 2025 grams of potassium-nitrate in water and making up to 100 liters.

*Example 3.*—A disinfecting solution of high efficiency is obtained by mixing one liter of a 1/15 normal sodium-hydrate solution with 1 liter ⅓ normal solution of chloride of potash. This will result in 2 liters disinfecting liquid the normality of which with respect to sodium hydrate will be 1/30 and with respect to potassium-chloride will be ⅙ normal.

By means of my invention the germicide action becomes independent on the temperature employed, and it is possible to produce a complete destruction of the germs at ordinary temperature of the room, that is to say between about 10 to 30 degrees C. and in a few minutes while with the electrolytic liquids hereinbefore referred to and prepared according to the previous art it took at least four hours on an average to produce complete disinfection, which makes such previous processes unfit for use in the art of manufacturing alimentary products, fermented liquors and the like. In this connection it is a point of great importance that even with the highest concentrations employed according to this invention there is no liability of any injurious actions upon the human system or upon the products of manufacture, if by some accident portions of the washing and disinfecting liquors of the invention should happen to remain in the containers or apparatus or conduits, as the concentrations are altogether too low for such action and the said liquors are free from any specific poisoning agents.

It should be noted that the invention has been described herein only in its broad features and the concentrations are only approximate and are given by way of exemplification, and modifications may occur and equivalents may be used within the spirit of the invention, except as otherwise appears from the appended claims.

I claim:—

1. A disinfecting and sterilizing composition, comprising an aqueous, approximately one-thirty-third to one-eighth normal solution of water-soluble electrolytes containing free active ions, and in the presence of an amount of water-soluble substantially neutral mineral salts corresponding to a maximum concentration of said salts of substantially one-seventh to one-half normal.

2. A disinfecting and sterilizing composition, comprising an aqueous, substantially one-thirty-third to one-eighth normal solution of water-soluble, free, mineral electrolytes, and containing amounts of neutral water-soluble mineral salts, selected from the alkali-metal and alkali-earth groups to correspond to a maximum concentration of said salts of substantially one-seventh to about one-half normal.

3. A disinfecting and sterilizing composition, comprising an aqueous, approximately one-thirty-third to one-eighth normal solution of a water-soluble free mineral acid electrolyte, and containing neutral mineral water-soluble salts selected from the alkali-metal and alkaline-earth groups, said salts corresponding to a maximum strength of substantially one-seventh to one-half normal.

4. A disinfecting and sterilizing composition, comprising an aqueous, substantially one-thirty-third to one-eighth normal solution of a readily water-soluble free acid-ions-producing electrolyte in the presence of such an amount of a mineral neutral water-soluble salt selected from the alkali-metal and alkaline-earth groups and possessing oxygen-containing acid radicals as will correspond to a maximum concentration of about one-seventh to about one-half normal.

5. A disinfecting and sterilizing composition comprising a mixture of an aqueous solution of free sodium-oxyhydrate and of an aqueous solution of sodium-chloride, each one of said substances being present in their respective solutions in amounts corresponding substantially to one-tenth to one-fifteenth normal, the said mixture possessing a pH-coefficient around substantially 13.07.

6. A disinfecting and sterilizing composition, comprising a mixture of an aqueous solution of free nitric acid and of an aqueous solution of potassium-nitrate, each of which substances is present in its respective solution in quantities corresponding substantially to one-tenth to one-fifteenth normal and showing a pH-coefficient around about 1.07.

7. A disinfecting and sterilizing composition, comprising an approximately one-thirty-third to substantially one-eighth normal solution of a water-soluble free mineral electrolyte, the said solution containing also an amount of substantially one-seventh to one-half normal alkali-fluoride.

OTTO ORNSTEIN.